3,608,150
INJECTION MOLDING OF LIQUID
THERMOSETTING RESINS
Leon Laufer, Bayside, and Steve Noto, Brooklyn, N.Y.,
assignors to Daniel Machlin, Far Rockaway, N.Y.
Filed Jan. 22, 1969, Ser. No. 793,098
Int. Cl. B29f 1/00
U.S. Cl. 18—30
23 Claims

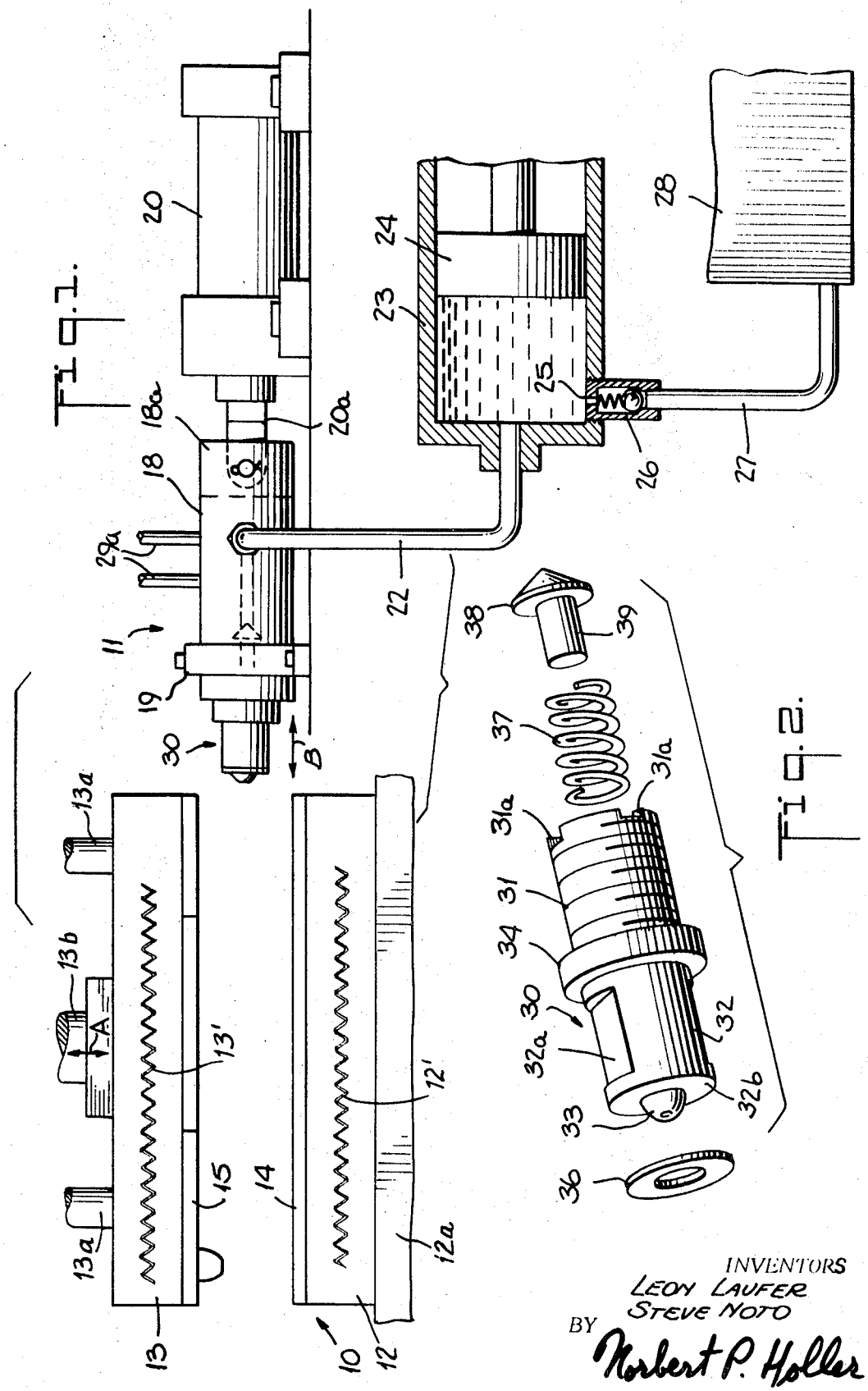

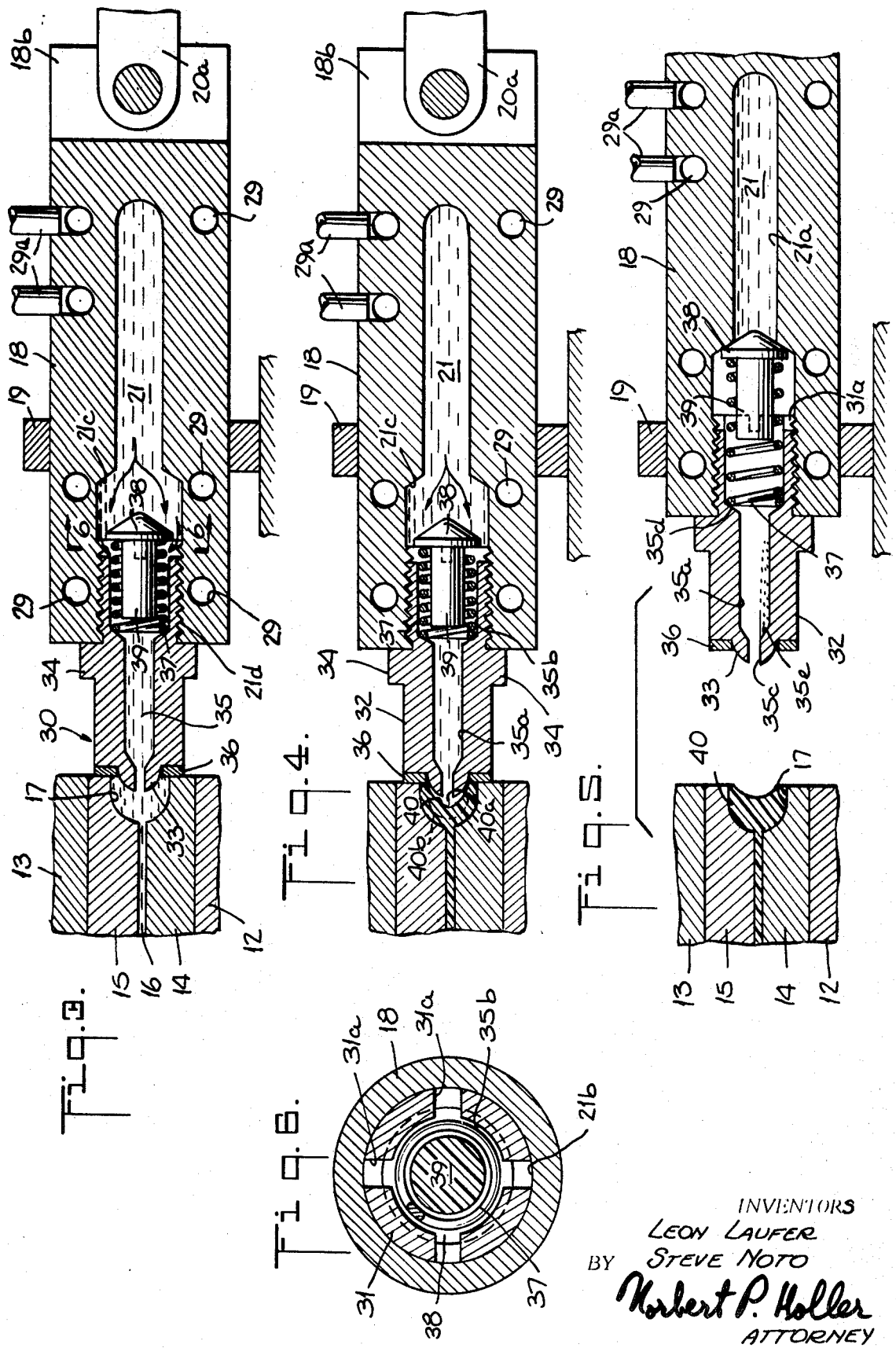

ABSTRACT OF THE DISCLOSURE

The instant application discloses a novel injection mold sprue and nozzle combination which enables a trouble-free injection molding of quick-curing liquid thermosetting resins to be achieved. The combination is characterized by the provision of a mold sprue which is in the form of a recess considerably larger than the nose of the nozzle to be juxtaposed thereto and defines a hiatus between the discharge end of the nozzle bore and the inlet end of the mold runner system, thereby contrasting with conventional arrangements which are characterized by a flush and tight nozzle to mold fit to bring the nozzle bore and the mold runner system into abutting and directly communicating end to end relation. The depth of that part of the sprue which is not occupied by the nozzle must exceed the depth of the runner system. Thus, since the resin filling the sprue gels inwardly from the walls thereof, the injection pressure can be released and the nozzle separated from the mold before the gelation of the resin in the sprue is completed, thereby avoiding the possibility of the resin gelling back into the nozzle. A check valve is provided in the nozzle system to inhibit after-dribble of resin as well as aspiration of air into the resin supply upon release of the injection pressure.

---

The foregoing abstract is not to be taken either as a complete exposition or as a limitation of the present invention, and in order to understand the full nature and extent of the technical disclosure of this application, reference must be had to the following detailed description and the accompanying drawings as well as to the claims.

This invention relates to the art of injection molding of thermosetting resin materials for the manufacture of molded articles of various types, and in particular to the injection molding of thermoseting resins which are liquid at room temperature.

In the prior copending applications of Irving Haber et al. entitled "Injection Molding Process and Apparatus for Effecting Same," Ser. Nos. 425,896 (now abandoned), 563,335 and 644,960, all assigned to the same assignee as the instant application, there are disclosed basic techniques and equipment for injection molding liquid thermosetting resins, and those disclosures are, accordingly, hereby incorporated herein by reference. As there pointed out, one of the areas of molding operations in which the disclosed processes and apparatus are found to be highly advantageous is the field of encapsulation of electrical and electronic devices and components, e.g. transistors, diodes, capacitors, integrated circuits, etc., where the use of low molding pressures and low temperatures is necessary to achieve good results. In this field, low molding temperatures must be utilized since excessive heat used in curing the resin would tend to have adverse effects on the electrical characteristics of the encapsulated devices, and low molding pressures must be utilized so as not to distort the invariably delicate mold inserts, i.e. the items being encapsulated.

Prior to the aforesaid Haber et al. inventions, however, all of the various attempts which had been made to provide and improve high quality mass production techniques in this field were found wanting in one respect or another and did not yield the required solutions to the problems with which the industry was faced. Thus, conventional compression, transfer and injection molding processes utilizing standard thermosetting resin molding materials in granular or other solid form requiring pre-molding plasticization have been of only limited value because of their inherent high pressure and temperature requirements. On the other hand, even in such low-pressure molding techniques as potting or casting liquid thermosetting resins onto and about the electronic components to be encapsulated, problems are encountered because of the difficulties of avoiding entrapment of air bubbles in the resin, lack of product uniformity, and the like, the difficulty of shortening the molding cycle, etc. The application of low-pressure and low-temperature injection molding techniques to encapsulation with liquid thermosetting resins had also been proposed prior to the said Haber et al. inventions, for example in U.S. Pats. No. 2,577,055 and No. 2,892,214, but the teachings of these patents have apparently failed to be accepted by the industry, most probably because neither the equipment devised nor the processing conditions prescribed to implement such teachings were able to overcome the difficulties inherent in the handling and molding of such materials.

The basic techniques and equipment for injection molding of liquid thermosetting resins disclosed and claimed in the aforesaid Haber et al. applications were the first which overcame the drawbacks and disadvantages of the then known techniques and equipment and made it possible to produce high quality molded articles at vastly increased productivity rates and manufacturing economies. Merely by way of example, the production of encapsulated electronic components and devices without voids in the resin due to entrapped air bubbles, with electrical properties closer than ever to the ratings of the encapsulated devices, in radically shorter mold cycles, and with a substantially reduced number of rejects or defective finished parts resulting from improper molding or from mechanical damage caused to the inserts during the injection of the molding material, became feasible. Moreover, these new injection molding processes are applicable as well to the production of other types of molded articles ranging from the very small, e.g. buttons, to much larger ones, e.g. automotive distributor caps, lenses, dishes, attache cases, chairs, and even car bodies, and to the use of such varied liquid 100% solids thermosets as polyesters, epoxies, epoxy-polyamides, allyl resins, silicones, phenolics, polyurethanes, and the like, in both filled and unfilled systems.

As in all previously known injection molding techniques, however, the equipment disclosed in Haber et al. applications is also characterized by the fact that the discharge end or nose of the nozzle during the actual injection of the resin into the mold is in flush and full surface to surface contact with a correspondingly contoured and dimensioned sprue provided on the mold at the inlet end of the runner system. Although not inherently disadvantageous, this arrangement does lead to some complications. Thus, in order to prevent the the gelation of the resin in the mold runner system from backing up through the sprue into the injection nozzle, the timing of the shot, i.e. the duration of nozzle contact with the mold, is critical within very narrow limits, and continuous cooling of the nozzle and possibly separate cooling of the portion of the mold in the vicinity of the sprue are required. It is also difficult to prevent the dribbling of resin from the nozzle after the completion of each shot.

It is an important object of the present invention, therefore, to provide a novel nozzle and mold sprue combination for use in the injection molding of liquid thermosetting resins which greatly improves the operating characteristics of the system as a whole.

A more specific object of the present invention is the provision of a novel injection molding nozzle and sprue combination which minimizes in a simplified manner both the possibility of the nozzle becoming blocked by gelation of the resin backing up from the runner system of the mold into the nozzle and the possibility of resin dribbling from the nozzle and air being sucked into the resin supply at the end of each shot.

Concomitantly, it is also an object of the present invention to provide a novel check valve for the nozzle of an injection molding system characterized by such a nozzle and sprue combination.

Generally speaking, the objectives of the present invention are attained by a construction in which the mold sprue is of such size in relation to the discharge end of the nozzle that a relatively large volume chamber, of a depth not less than, and preferably somewhat greater than, that of the runner system, is defined between the exit end of the nozzle passageway and the inlet end of the mold runner system. This chamber, which is defined in the sprue, is completely filled with resin at each shot, but since the resin occupying the sprue gels inwardly from the wall surface of the sprue, the arrangement ensures that even when the resin in the runner system has gelled completely, there is still a body of liquid, uncured resin interposed between the discharge end of the nozzle and the bottom of the sprue. Thus, the criticality of the duration of contact between the nozzle and the mold is lessened somewhat, and the injection pressure can be released and the nozzle and mold separated from each other, e.g. by retraction of the nozzle, before the gelation of the resin can reach the discharge end of the nozzle. Upon release of the pressure, which may slightly precede the retraction, the check valve closes automatically to prevent any aspiration of air into the resin supply and also to reduce the possibility of resin dribbling from the nozzle.

The foregoing and other objects, characteristics and advantages of the present invention will be more clearly understood from the following detailed description thereof when read in conjunction with the accompanying drawings, in which:

FIG. 1 is a fragmentary, generally schematic, elevational view of an injection molding apparatus embodying the principles of the present invention, some parts being broken away or shown in section;

FIG. 2 is an exploded perspective view of the nozzle and check valve construction incorporated in the injection system of the apparatus shown in FIG. 1;

FIGS. 3, 4 and 5 are fragmentary longitudinal sections, on an enlarged scale, through the apparatus shown in FIG. 1 and illustrate different stages of an injection molding operation; and FIG. 6 is a sectional view taken along the line 6—6 in FIG. 3.

Referring now to the drawings in greater detail, the injection molding apparatus according to the present invention as schematically illustrated in FIG. 1, comprises a press 10 and an injection mechanism 11. The press includes a lower or base platen 12 fixed on a suitable rigid supporting structure 12a and an upper platen 13 mounted and guided in any suitable manner by means of guide rods 13a for vertical reciprocal movement, as indicated by the double-headed arrow A, under the action of a ram 13b toward and away from the stationary base platen 12. The two platens are also provided, respectively, with means (not shown) for rigidly supporty and with means, e.g., electrical or other types of heaters 12' and 13' for heating the lower and upper halves 14 and 15 of a mold which, upon being closed, define one or more mold cavities (not shown) arranged in communication with a runner system 16, at the inlet end of which is provided a sprue 17 the characteristics of which constitute an important aspect of the present invention, as will be more fully explained presently.

The injection mechanism 11 generally includes a nozzle housing 18 mounted, preferably on the same base structure as the platens 12 and 13, for sliding, longitudinal, reciprocal movement toward and away from the press 10, as indicated by the double-headed arrow B, through a suitable guide bracket structure 19. At its rear end, the housing 18 is bifurcated or otherwise provided with a pair of rearwardly extending flanges 18a and 18b to which is articulated the front end of the piston rod 20a of a piston (not shown) slidably arranged in a double-acting hydraulic cylinder 20. The housing 18 is provided with an internal passageway or bore 21 extending longitudinally therethrough which includes a rear section 21a and a front section 21b, the latter being of somewhat greater diameter than the former, and the bore wall 21c at the junction of the two sections being in the form of a frusto-conical surface, for a purpose which will become clear as the description proceeds. The enlarged diameter bore section 21b is internally threaded in its front end region 21d.

At its rearwardmost end, the bore 21 communicates via a flexible conduit 22 with the discharge end of a metering and injection cylinder 23 which houses a reciprocally movable, hydraulically actuated piston 24 provided with suitable peripheral sealing means (not shown). Near its discharge end, the cylinder 23 is provided with an inlet opening 25 controlled by a spring-pressed check valve 26 to which is connected a conduit 27 communicating with a suitable reservoir 28 containing a supply of the liquid thermosetting resin to be injection molded. The housing 18 is further provided with an internal network of ducts 29 through which a cooling liquid such as cold water may be circulated via inlet and outlet hoses 29a connected with any suitable pumping mechanism (not shown).

The front end of the housing 18 supports an injection nozzle 30 which, as shown in FIG. 2, is in the form of an elongated tubular member having a rear, externally threaded section 31 adapted to be screwed into the housing bore section 21d, a generally smooth front section 32 terminating in a small, dome-like nose 33 the characteristics of which also constitute an important aspect of the present invention, as will be more fully explained presently, and an enlarged, circumferential shoulder or flange section 34 intermediate the sections 31 and 32. The front section 32 of the nozzle is advantageously provided with a pair of diametrically opposite flats 32a to enable the nozzle to be gripped by a wrench or similar tool for insertion into or removal from the front end of the nozzle housing 18. The nozzle 30 has an interior bore 35 which includes a middle section 35a the diameter of which is less than that of its rear section 35b within the threaded nozzle section 31 and greater than that of its front section 35c within the nose 33 of the nozzle. A sealing washer 36 of any suitable material is secured to the front end face 32b of the nozzle in surrounding relation to the nose 33 thereof, and a plurality of slots or notches 31a (see also FIG. 6) is provided in the rear edge of the threaded nozzle section 31.

Arranged in the largest section 35b of the nozzle bore 35 is a compression spring 37 the front end of which is seated against the shoulder 35d defined at the juncture of the nozzle bore sections 35a and 35b. The other end of the spring 37 bears against the underside of a valve member 38 having a generally conically shaped top surface mated to that of the conical portion 21c of the wall of the nozzle housing bore 21. For purposes of stability, the valve member 38 has a stem 39 extending into the spring 37. The arrangement is such that, with the nozzle fully screwed into the bore 21 to the extent permitted by the flange 34 and in the absence of any application of pressure to the top side of the valve member 38 sufficient to overcome the force of the spring 37, the check valve constituted by these elements will be in its closed state best illustrated in FIG. 5.

As previously indicated, a principal feature of the present invention is the fact that the nozzle and sprue combination is characterized by a certain size of the sprue 17 of the mold, in particular by the provision between the nozzle bore and the runner system, of a sprue the depth of which is preferably greater than that of the runner system. This relationship in the illustrated embodiment of the invention is best shown in FIGS. 3 and 4, from which the relative sizes of the nozzle nose 33 and the sprue 17 can be seen (the effect is actually enhanced by the provision of the washer 36), and from which also the contrast between the arrangement according to the present invention on the one hand, i.e. the lack of direct communication between the nozzle bore 35 and the mold runner system 16, and the heretofore conventional nozzle/sprue association on the other hand, i.e. the abutting end to end disposition of the nozzle bore and the runner system, will be immediately apparent to those skilled in the art. The oversize sprue 17 thus effectively provides an unoccupied space or chamber interposed between the exit end of the nozzle bore section 35c and the inlet end of the mold runner system 16, the function of which will now be described. For the purposes of the present invention, the depth of the space in the sprue not occupied by the nozzle, i.e. the linear distance from the surface of the nozzle to the sprue wall surface, must be at least equal to the depth of the runner system and preferably is about twice as great or more.

In operation, first the mold halves 14 and 15 are properly positioned on the press platens 12 and 13 and heated to the desired temperature, before the platen 13 is lowered to close the mold. At this time, of course, the nozzle 30 is in its retracted position shown in FIG. 1, and the valve member 38 is pressed against its seat 21c by the spring 37. Concomitantly, the piston 24 in the cylinder 23 is retracted to draw a charge of the resin system to be molded from the reservoir 28 into the cylinder, to ensure that the charge in the latter is more than sufficient to meet the requirements of the upcoming shot. Preferably, the resin in the reservoir will have been de-aerated, either before or after its arrival there, and thus the entire injection system should be air-tight. For the illustrated apparatus, the only place which need be mentioned in this regard is the check valve in the nozzle (at all other locations the precautions to be taken are sufficiently standard to require no discussion). In accordance with the present invention, this objective is attained by the use, in conjunction with a spring of sufficient strength and a valve seat of as smooth a surface as possible, of a valve member having its conical surface made in its entirety of a suitable synthetic resinous material, for example polytetrafluoroethylene or the like, which is possessed of the requisite sealing properties and is both physically and chemically resistant to attack by the molding materials being injected. In the simplest form of this aspect of the invention, the entire valve member 38, including its stem 39, is molded of the synthetic resinous sealing material.

The mold is now closed in the usual manner, although this will be done under pressures considerably lower than the clamping pressures used in conventional injection molding processes, by virtue of the fact that the injection pressures required for injection molding liquid thermosets by the aforesaid Haber et al. techniques need not be and are not nearly as high as conventional injection molding pressures. Where electronic components or the like are to be encapsulated, the mold clamping pressure must also be so limited as not to lead to any damage to the delicate lead wires of the items being encapsulated. The mold will, of course, also be suitably vented to enable air to be expelled therefrom by the advancing resin during the injection operation.

As soon as the mold is closed, the cylinder 20 is actuated to protract the nozzle 30 toward the mold and press the washer 36 against the mold with sufficient force to prevent any leakage of resin out of the sprue 17. It should be noted that with the nozzle continuously cooled to a temperature well below the setting temperature of the resin by the circulation of cold water or the like through the ducts 29 in the housing 18, the washer may even be of a thermally conductive material such as metal. Washers made of copper, aluminum, brass, soft iron and like malleable and compressible metals are found to be highly satisfactory, offering not only a good sealing capability due to the relative softness of the metal, but also a superior service life due to their high resistance to the repeated large compressive stresses to which such a washer is subjected in the course of successive shots. Washers made of thermally non-conductive materials, e.g. polytetrafluoroethylene, fibers, etc., may also be used, of course, especially if it is desired to dispense with the liquid cooling of the nozzle, subject to the requirement, however, that the insulating value of the washer must be adequate to ensure that over the duration of contact in each shot not enough heat is transferred from the mold to the nozzle to cause the resin in the latter to set.

With the apparatus in this stage, the piston 24 is actuated toward the front of the cylinder 23 to increase the pressure on the resin therein to the prescribed injection pressure. The application of this pressure, which in certain cases may be as low as about 5 p.s.i., to the valve member 38 causes the latter to be displaced away from the seat 21c and held against the rear end of the nozzle section 31 against the force of the spring 37, whereby the resin is enabled to flow past the check valve 38 into the nozzle passageway 35 and thence in sequence into the mold sprue 17, the runner system 16 and the mold cavity or cavities. The condition of the apparatus is then as shown in FIG. 3. It will be noted that in the illustrated apparatus, the slots 31a in the rear end of the nozzle section 31 are provided to permit the resin flow to take place with the valve member 38 in its fully open position. During this operation, of course, the injection pressure also maintains the check valve 26 closed, preventing any backflow of any position of the metered resin charge into the reservoir 28.

The injection pressure is maintained at full value for a predetermined time interval which in essence will depend on a variety of factors such as the characteristics of the mold (including the sizes of the runners, gates and mold cavities), the chemical and physical properties of the resin system (including composition, viscosity both before and after entering the mold, etc.), the types and sizes of articles being molded, the curing temperatures employed, etc. In any case, however, it is generally necessary to maintain this pressure until at least the resin in the mold runner system has gelled substantially completely. In an injection molding system characterized by a conventional nozzle/sprue association, i.e. one where the nozzle bore feeds directly into the inlet end of the runner system and the discharge end of the nozzle is in flush contact with the surface of the mold or the sprue, this raises a problem of sorts since the gelation of the resin in the usually relatively shallow runner system takes place very rapidly, which makes the time element for separating the nozzle from the mold extremely critical if gelation of the resin in the nozzle is to be avoided.

This problem is effectively minimized by the nozzle and sprue combination according to the present invention, as will be clearly understood from FIG. 4. In the sprue 17 (as in every part of the mold), the resin gels first at the mold surface, from which the gelation spreads inwardly of the mass of resin. Thus, since the sprue is considerably wider than the runner, the resin in the sprue tends to gel in a somewhat bowl or cup-like form, as shown at 40 in FIG. 4. Consequently, with the nose 33 of te nozzle being so much smaller than the sprue, for an appreciable interval as the gelation of the resin in the sprue proceeds, there will be a residue of uncured liquid resin, designated 40a, at the center of the sprue in the region thereof surrounding the nose of the nozzle. For the purpose of enabling the injection pressure to be released, however, a gelation of the resin in the sprue to a much more limited thickness, approximating that of the runner and designated by the broken line 40b, would be sufficient. It will be understood that the uncured liquid resin in the sprue will aso function, by virtue of its low temperature, as a type of thermal insulation between the mold and the nozzle, to the end of minimizing the transfer of heat from the mold to the nozzle. The arrangement according to the present invention thus provides a comparatively large and less critical time interval during which the pressure can be released by reversal of the injection piston 24 (which is also effective to cause a fresh charge of resin to be drawn into the cylinder 23) and the nozzle separated from the mold by reverse actuation of the cylinder 20. Once this has been done, of course, the parts are in the condition shown in FIG. 5, with the valve 38 closed again, and at the same time the cure of the resin in the mold cavities and the sprue continues to completion, whereupon the mold is opened and the molded parts extracted or ejected therefrom together with the molded runner and sprue in any suitable manner, preparatory to the next molding operation.

The construction of the nozzle 30 and the check valve 38–39 also leads to some other advantages. Thus, as the injection pressure is released, uncured liquid resin in the nozzle bore section 35c is drawn back into the sections 35a and 35b, and it will be retained behind the weir-like portion 35e of the bore wall at the juncture of the sections 35a and 35c, whereby the possibility of this remaining resin dribbling from the nozzle after retraction of the nozzle from the mold is effectively prevented. At the same time, the valve member 38 is snapped into its closed position by the spring 37 as soon as the pressure is released and before the seal between the nozzle and the mold is broken, whereby not only is any aspiration of air into the resin remaining in the passageway 21 and cylinder 23 effectively prevented, but also any flow of resin from the bore 21 into the nozzle during the interval between shots.

It will be understood that the foregoing description of preferred aspects of the present invention is for purposes of illustration only, and that the various structural and operational features and relationships herein disclosed are susceptible to a number of modifications and changes none of which entails any departure from the spirit and scope of the present invention as described in the hereto appended claims.

Having thus described the invention, what is claimed and desired to be protected by Letters Patent is:

1. In an apparatus for injection molding thermosetting resins which are liquid at room temperature, wherein the apparatus includes a sectional mold having a runner system leading to one or more mold cavities, means for clamping the mold sections together, means for heating said mold, an injection nozzle having a bore, means for selectively reciprocating said nozzle against and away from said mold, and means for injecting a charge of liquid thermosetting resin under pressure through said nozzle and into said runner system; the improvement comprising the combination, with said nozzle, of a sprue on said mold at the inlet end of said runner system and adapted to receive the liquid resin material to be injection molded from said nozzle when the latter is in contact with said mold, said sprue being sufficiently large to define, when said nozzle is in contact with said mold, a chamber effectively interposed between the end of said nozzle defining the discharge end of said bore and said inlet end of said runner system and having a depth at all points of the nozzle end surface facing said chamber sufficiently larger than the depth of said runner system and sufficient to ensure the presence of a body of liquid resin over all of said nozzle end surface and between said nozzle and said runner system when the resin in the latter has gelled completely at least along a cross section between the cavity and sprue.

2. Apparatus according to claim 1, wherein the depth of said chamber is about twice the depth of said runner system.

3. Apparatus according to claim 1, said means for reciprocating said nozzle comprising a housing having an internal passageway, said nozzle being secured to said housing at one end of said passageway, said passageway establishing communication between the inlet end of said bore and said injection means, and a normally closed check valve arranged in said passageway adjacent the juncture of the latter with said inlet end of said bore, said check valve being adapted to be opened by the pressure of the liquid resin during an injection operation.

4. Apparatus according to claim 3, wherein the wall defining said passageway includes a conically shaped portion flaring toward said bore and defining a valve seat, and said check valve includes a valve member having a conically shaped surface facing toward and mated to said valve seat.

5. Apparatus according to claim 4, wherein said surface of said valve member is defined by a body of synthetic resinous sealing material.

6. Apparatus according to claim 5, said check valve further including a compression spring bearing at one end against a portion of said nozzle and at the other end against a part of said valve member opposite said conical surface of the latter, to bias said valve member toward said valve seat.

7. Apparatus according to claim 3, said housing being provided with duct means for circulating a cooling fluid thereabout in heat exchange relationship with said passageway and said nozzle.

8. Apparatus according to claim 1, said nozzle being provided at the mold-contacting end face thereof with a nose in which said discharge end of said bore is located, said nose being sufficiently smaller than said sprue so that, when said nose is received in said sprue, the space in said sprue not occupied by said nose constitutes said chamber of the required depth.

9. Apparatus according to claim 8, wherein the linear distance from the surface of said nose to the sprue wall surface is equal to about twice the depth of said runner system.

10. Apparatus according to claim 8, further comprising a washer carried by said nozzle in surrounding relation to said nose for sealing engagement with the portion of said mold bounding said sprue, said washer being effective to still further reduce the extent to which said nose projects into said sprue.

11. Apparatus according to claim 10, wherein said washer is made of metallic sealing material.

12. Apparatus according to claim 10, wherein said washer is made of synthetic resinous sealing material.

13. Apparatus according to claim 10, wherein said washer is made of fibrous sealing material.

14. Apparatus according to claim 8, said means for reciprocating said nozzle comprising a housing having an internal passageway, said nozzle being secured to said housing at one end of said passageway, said passageway establishing communication between the inlet end of said bore and said injection means, and a normally closed check valve arranged in said passageway adjacent the juncture of the latter with said inlet end of said bore, said check valve being adapted to be opened by the pressure of the liquid resin during an injection operation.

15. Apparatus according to claim 14, wherein the wall defining said passageway includes a conically shaped portion flaring toward said bore and defining a valve seat, and said check valve includes a valve member having a conically shaped surface facing toward and mated to said valve seat.

16. Apparatus according to claim 15, wherein said surface of said valve member is defined by a body of synthetic resinous sealing material.

17. Apparatus according to claim 16, said check valve further including a compression spring bearing at one end against a portion of said nozzle and at the other end against a part of said valve member opposite said conical surface of the latter, to bias said valve member toward said valve seat.

18. Apparatus according to claim 14, said housing being provided with duct means for circulating a cooling fluid thereabout in heat exchange relationship with said passageway and said nozzle.

19. Apparatus according to claim 14, further comprising a washer carried by said nozzle in surrounding relation to said nose for sealing engagement with the portion of said mold bounding said sprue, said washer being effective to still further reduce the extent to which said nose projects into said sprue.

20. Apparatus according to claim 19, wherein said washer is made of metallic sealing material.

21. Apparatus according to claim 19, wherein said washer is made of synthetic resinous sealing material.

22. Apparatus according to claim 19, wherein said washer is made of fibrous sealing material.

23. The apparatus of claim 1, wherein said mold comprises opposing separable mold sections and said sprue is delineated by opposing surfaces on said mold sections and separable therewith.

References Cited

UNITED STATES PATENTS

| | | | |
|---|---|---|---|
| 2,345,917 | 4/1944 | Coffman | 18—30 |
| 2,431,349 | 11/1947 | Stacy | 18—30 |
| 2,928,125 | 3/1960 | Smucker et al. | 18—30X |
| 3,321,806 | 5/1967 | Beebee | 18—30 |
| 2,090,489 | 8/1937 | Sommerfeld. | |

H. A. KILBY, JR., Primary Examiner